Feb. 1, 1927. 1,615,866
M. BERNHARD
HANGER
Filed May 27, 1926
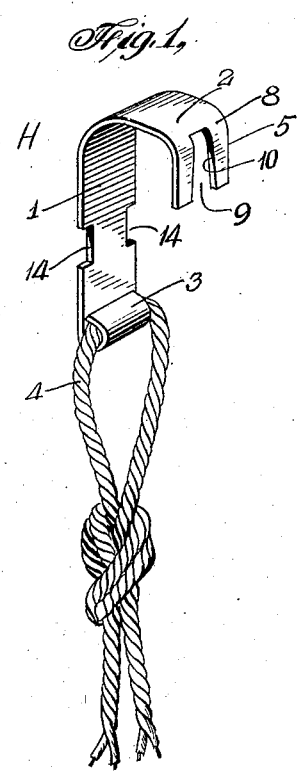
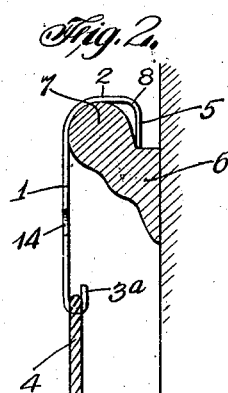
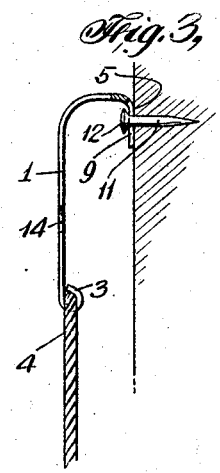
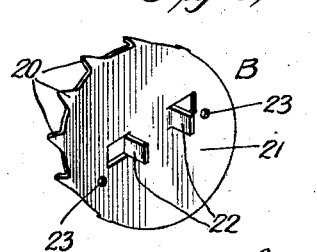
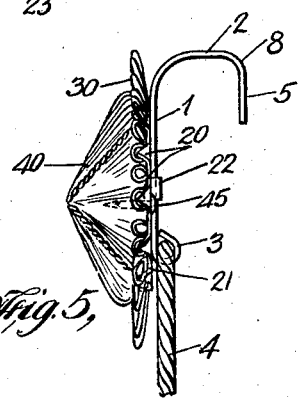
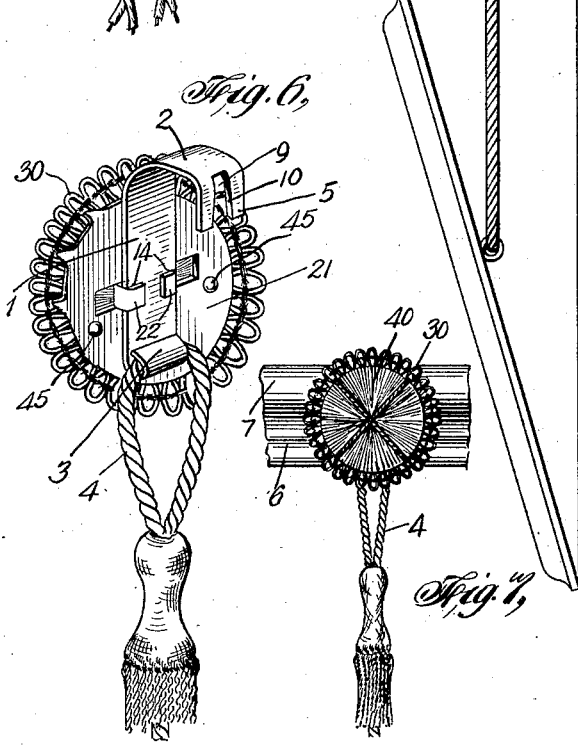
INVENTOR
Morris Bernhard
BY
J. Granville Meyers.
ATTORNEY Patented Feb. 1, 1927.

1,615,866

UNITED STATES PATENT OFFICE.

MORRIS BERNHARD, OF NEW YORK, N. Y.

HANGER.

Application filed May 27, 1926. Serial No. 111,998.

My invention relates to hangers for pictures, mirrors, etc.

An important object of the invention is to provide a simple, strong and inexpensive hanger which will co-operate with either a picture rail or a nail or screw projecting from a wall for the secure support of a picture, mirror or the like.

Another object is to arrange or construct such a hanger for combination or co-operation in an improved manner with a rosette structure, and especially to provide an improved rosette backing or support adapted for combination with the hanger proper to connect the rosette thereto.

To attain the above stated and other objects I provide a hanger which, preferably, has a straight or flat body or shank with a hook formation at each end thereof, these hook formations being preferably bent or directed toward the same side of the shank so that the opposite face of the shank is flat and clear for the ready application and secure support of the rosette base when it is desired to use the same. As an especially important feature of the hanger, the upper, main or supporting hook is formed to properly co-operate with the bead of a picture rail and the end portion of this hook is provided with a tapered slot or clevis which will engage the shank of a nail or screw with wedging and locking effect when it is desired to apply the hanger to a nail or screw instead of a rail. This wedging or locking engagement of the hook notch substantially prevents lateral movement or swinging of the hanger, practically insures against pulling of the hanger outwardly off of the nail even if the latter has no head, and the supporting hook also co-operates with a headed nail or screw to positively prevent outward displacement of the hanger unless it is lifted from the support. The lower or cord hook is formed to receive the picture cord (this term being used to include a cord or wire) and may be substantially closed to securely retain the cord or a loop thereof, or may be open to permit easy cord removal and application.

I also provide for use in connection or combination with such a hanger, a rosette support or base, consisting of a plate having means to co-operate with the rosette border and also provided with means for the easy and secure attachment of the rosette body or button, and also having readily operable means consisting in the present specific embodiment of bendable ears or lugs for firm connection to the hanger shank by bending the lugs about opposite edges thereof, whereupon the flat back face of the rosette base engages the flat outer face of the hanger shank, and the base is therefore firmly and securely supported on the hanger without the possibility of lateral movement, twisting or other displacement. Further, I preferably provide the edges of the hanger shank with opposite notches in which the rosette base lugs are located, this interlocking engagement of the lugs in the notches additionally preventing downward displacement of the rosette base and the rosette secured thereto in relation to the hanger.

The hanger and rosette base are so devised that they may be sold or distributed separately or may be supplied together but in unassembled form ready for assembly whenever the user desires to attach a rosette to a hanger for the decorative concealment of the same.

The rosette base or backing here disclosed is similar in some respects to that disclosed in my prior application, Ser. No. 87,839, filed February 12, 1926, but includes various modifications and improvements, especially with reference to its co-operation with a hanger of the type herein disclosed. Reference is made to the above mentioned application for a full explanation of the general character and uses of rosettes or equivalent decorative concealing devices in connection with picture hangers.

The characteristics and advantages of the invention are further sufficiently explained in connection with the following detail description of the accompanying drawing, which shows one representative embodiment of the invention. After considering this example, skilled persons will understand that many variations may be made, and I contemplate the employment of any structures that are properly within the scope of the appended claims.

In the drawings:

Fig. 1 is a perspective view of a hanger embodying a part of the invention in one form with a cord loop properly positioned in the lower or cord hook.

Fig. 2 is a side elevation showing this hanger, slightly modified, applied to a picture rail and supporting a picture therefrom.

Fig. 3 shows the hanger applied to a nail projecting from a wall surface.

Fig. 4 is a rear perspective view of a rosette base or backing embodying a part of the invention in one form.

Fig. 5 is a side elevation of the combined hanger and rosette back with a rosette properly applied thereto.

Fig. 6 is a rear perspective of the same.

Fig. 7 is a front elevation of the same.

The hanger H, Figs. 1, 2 and 3, usually consists of a strip of suitably strong and stiff sheet metal of substantial thickness, bent to provide a flat, straight shank 1, an upper or supporting hook 2 and a lower or cord hook 3, which in some cases may be substantially closed about the cord 4, as in Fig. 1, or may be left open for easy cord application and removal as at 3ª, Fig. 2. The supporting hook 2 is of generally curved form and of substantial length in order to space the downwardly bent end portion 5 substantially away from the shank and so to admit application of the hanger to a picture rail 6 having a molded edge or bead 7 of any reasonable shape or size. The manner in which the hanger is securely supported on the rail is easily understood from Fig. 2, without explanation. To provide for the alternative application of the hanger to a screw or nail projecting from a wall surface, the hook end portion 5, which is usually substantially straight and of substantial length below the bend 8, is provided with a central longitudinal notch or clevis 9, the edges 10 of which converge upwardly, usually at a moderate angle, so that when the hanger is applied to a nail, as 11, in Fig. 3, the nail shank fits within the notch or clevis and the edges 10 thereof engage the shank with a wedging or locking effect to substantially prevent lateral swinging of the hanger, and this locking engagement is also sufficient in most cases to prevent outward displacement of the hanger, even if the nail is headless. The usual nail head 12, however, positively prevents outward displacement, in an obvious manner. Because of the fact that the opposed walls 10 forming the notch or clevis 9 are arranged upon upwardly convergent lines, it is apparent that the weight of the picture, mirror or other object supported from the hook 3ª will operate to cause the converging edges to more firmly grip the nail or screw 11. In other words, the heavier the object supported the more firm will be the grip upon the nail or screw.

For co-operation with a rosette back when it is desired to use the same, opposite notches 14 are formed in the edges of the shank 1.

For use in connection or combination with such a hanger when it is desired to apply a decorative or sealing rosette or equivalent device thereto, I provide a rosette backing or base B, Fig. 4. This is a plate or disc of sheet material, usually metal of substantial thickness and stiffness, and is usually, although not necessarily, circular, to conform to the usual shape of the rosette or rosette button. The periphery of the disc is provided with a plurality of spaced prongs 20, bent outward at right angles to the plate or body 21 for co-operation with the rosette border and button, as below explained. The plate or disc 21 is also provided with means for co-operation with the hanger shank 1, this means consisting in a preferred form, as shown, of ears or lugs 22 formed from the integral body of the disc by punching operations and bent rearwardly perpendicular to the disc. At any convenient places, the disc or body is also provided with nail holes 23.

When it is desired to apply a rosette to the hanger, a base B is connected to the hanger H either before or after the rosette is applied to the base. This connection is effected by passing the lugs 22 into the hanger notches 14, whereupon the flat, vertical, central portion of the body or disc 21 rests against the flat, straight outer face of the hanger shank 1. The lugs are then bent over upon the rear face of the shank (Fig. 6) and the rosette base is thereupon securely and rigidly fastened to the hanger, the direct engagement of their flat faces preventing any rocking or tilting, and the positive interlocking of the lugs 22 in notches 14, preventing any vertical displacement of the rosette base upon the hanger. It is now evident that the arrangement of the hanger supporting hook and the cord hook or eye 3 at the same side of the shank 1, is important in providing a flat, straight and unobstructed base or face 1 of the hanger shank for reception of the rosette backing without any obstruction to the application of said backing, as in the case of the ordinary hanger, in which the supporting hook is directed toward one side of the shank, while the cord hook or eye, is directed toward the opposite side.

Rosettes used for this purpose usually consist of a border 30, which is usually of decoratively covered wire bent or looped in various forms, and a button 40, which is usually of wood covered with decorative fabric. Such rosettes are secured to the backing B by placing the border against the outer face of the backing and then placing the back of the button in centered relation against the outer face of the border, whereupon the prongs 20 pass between loops or convolutions of the border and engage the back face of the button, and the latter is secured by tacks or brads 45 driven through the nail holes 23.

Evidently, as above stated, the hanger and rosette base, with or without a rosette applied thereto, may be handled and sold separately, or may be supplied together but in separated condition, or may be completely assembled, as shown in Figs. 5 and 6, and so supplied to dealers or users.

I claim:

1. A hanger of the class described, comprising a substantially straight, flat shank, a hook at one end thereof having its end down-turned to connect the hanger to a picture rail or like support, and a cord hook at the other end of the shank having its end up-turned for support of a picture cord, both hooks being directed toward the same side of the shank to provide at the opposite face of the shank a smooth, flat surface for reception of a rosette base, the shank being provided near its opposite edges with openings designed to detachably receive and positively retain bendable fastening members of a rosette base to secure the latter firmly irrevolubly in position on the shank.

2. A hanger of the class described, comprising a substantially straight shank, a supporting hook at one end thereof, the end of said hook having a notch for co-operation with a nail shank, and a cord hook at the other end of the shank, the shank having notches in opposite edges for co-operation with fastening members of a rosette base.

3. A hanger of the class described, comprising a substantially straight shank, a supporting hook at one end thereof, the end of said hook having a notch for co-operation with a nail shank, a cord hook at the other end of the shank, the shank having notches in opposite edges for co-operation with fastening members of a rosette base, and a rosette base designed for co-operation with the hanger and including a substantially flat sheet body having bendable spaced lugs extending from one side thereof for co-operation with the hanger shank notches to secure the rosette base to the hanger.

4. A hanger of the class described, comprising a substantially straight shank, a supporting hook at one end thereof, the end of said hook having a notch for co-operation with a nail shank, and a cord hook at the other end of the shank, both of the hooks being located at the same side of the shank to provide a flat, straight, unobstructed surface thereof for co-operation with a rosette, the shank having notches in opposite edges for co-operation with fastening members of the rosette base.

5. A hanger of the class described, comprising a substantially straight shank, a supporting hook at one end thereof, the end of said hook having a notch for co-operation with a nail shank, a cord hook at the other end of the shank, both of the hooks being located at the same side of the shank to provide a flat, straight, unobstructed surface thereof for co-operation with a rosette, the shank having notches in opposite edges for co-operation with fastening members of the rosette base, and a rosette base designed for co-operation with the hanger and including a substantially flat sheet body having border-securing prongs extending from one side thereof and having bendable spaced lugs extending from the other side for co-operation with the hanger shank notches to secure the rosette base to the hanger.

6. A combined hanger and rosette backing structure comprising a hanger having a substantially straight shank, one face of which is flat and unobstructed, a large supporting hook at the upper end of the hanger, said hook being devised for co-operation with a picture rail and its end portion being provided with a tapered notch for wedging co-operation with a nail shank, a cord hook at the lower end of the shank, both said hooks extending in the same direction from the shank, a rosette base of flat sheet metal lying against said flat, unobstructed face of the hanger shank and provided with means for co-operation with rosette members, the hanger shank and the rosette base having co-operating interlocking means securing them together and positively preventing longitudinal or other displacement of the hanger in relation to the rosette base.

7. A combined hanger and rosette backing structure comprising a hanger having a substantially straight shank, one face of which is flat and unobstructed, a large supporting hook at the upper end of the hanger, said hook being devised for co-operation with a picture rail and its end portion being provided with a tapered notch for wedging co-operation with a nail shank, a cord hook at the lower end of the shank, both said hooks extending in the same direction from the shank, a rosette base of flat sheet metal lying against said flat, unobstructed face of the hanger shank and provided with means for co-operation with rosette members, the hanger shank having opposite notches, and the rosette base having spaced lugs located in the notches and bent upon the opposite face of the shank to positively secure the hanger and rosette base together and prevent relative displacement thereof.

Signed at New York city, in the county of New York and State of New York this 26th day of May, A. D. 1926.

MORRIS BERNHARD.